(12) United States Patent
Rose et al.

(10) Patent No.: US 8,517,057 B2
(45) Date of Patent: Aug. 27, 2013

(54) PUMP INSTALLATIONS

(75) Inventors: Joseph Rose, Hailsham (GB); Robert Covey, Hailsham (GB)

(73) Assignee: Aspen Pumps Limited, East Sussex (GB)

( * ) Notice: Subject to any disclaimer, the term of this patent is extended or adjusted under 35 U.S.C. 154(b) by 0 days.

(21) Appl. No.: 13/087,507

(22) Filed: Apr. 15, 2011

(65) Prior Publication Data

US 2011/0253242 A1  Oct. 20, 2011

(30) Foreign Application Priority Data

Apr. 19, 2010  (GB) .................................. 1006441.8

(51) Int. Cl.
*F16L 55/04* (2006.01)

(52) U.S. Cl.
USPC .................. 138/30; 138/26; 138/42; 138/44; 181/222; 181/232

(58) Field of Classification Search
USPC ................. 138/26, 30, 42, 44; 181/222, 232, 181/238, 256, 257, 275, 281
See application file for complete search history.

(56) References Cited

U.S. PATENT DOCUMENTS

| | | | | |
|---|---|---|---|---|
| 2,675,088 | A * | 4/1954 | McLeod | 181/265 |
| 3,147,097 | A * | 9/1964 | Aguas | 96/383 |
| 3,545,565 | A * | 12/1970 | McCaffrey, Jr. | 181/256 |
| 4,611,633 | A * | 9/1986 | Buchholz et al. | 138/26 |
| 4,705,138 | A * | 11/1987 | Reese | 181/212 |
| 5,262,600 | A * | 11/1993 | Woods | 181/227 |
| 5,444,196 | A * | 8/1995 | Woods | 181/227 |
| 5,892,186 | A * | 4/1999 | Flugger | 181/252 |
| 5,941,283 | A * | 8/1999 | Forte | 138/26 |
| 6,123,108 | A * | 9/2000 | Chen et al. | 138/30 |
| 6,269,841 | B1 * | 8/2001 | Chen et al. | 138/30 |
| 6,478,053 | B2 * | 11/2002 | Zanardi | 138/30 |
| 6,880,670 | B2 * | 4/2005 | Dondi | 181/269 |
| 7,380,572 | B2 * | 6/2008 | Chen | 138/26 |

* cited by examiner

*Primary Examiner* — Patrick F Brinson
(74) *Attorney, Agent, or Firm* — Fay Sharpe LLP

(57) ABSTRACT

The present invention relates to improvements in or relating to pump installations, It has particular relevance in the field of reciprocating piston pumps, such as condensate removal pumps which are used to remove condensate from air conditioning installations. We describe a liquid pulse damping device (20) comprising a body (21) having an inlet (22) and an outlet (23) in fluid communication. Intermediate the inlet and outlet is at least one liquid flow direction changing element (24, 25). Preferably, the at least one flow direction changing element (24, 25) is in the form of an elongate element having a closed end (30, 31) and a side wall, suitably a cylindrical side wall, having at least one bore (40) formed therethrough.

3 Claims, 4 Drawing Sheets

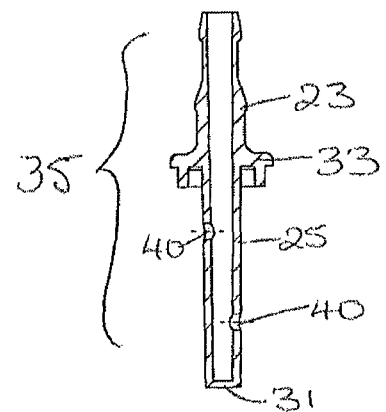
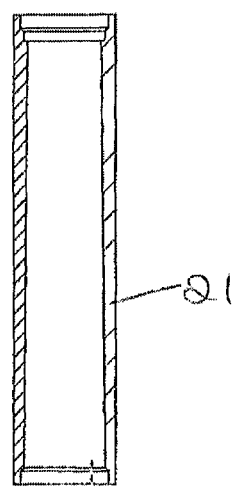
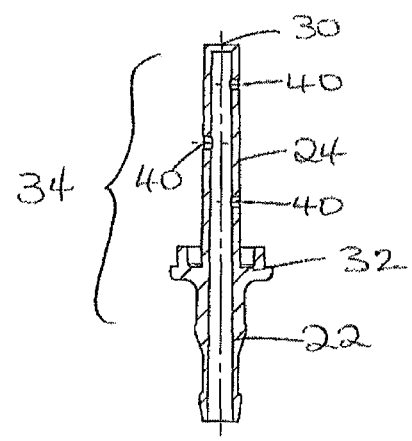
FIG 3

PUMP INSTALLATIONS

BACKGROUND OF THE INVENTION

The present invention relates to improvements in or relating to pump installations. It has particular relevance in the field of reciprocating piston pumps, such as condensate removal pumps which are used to remove condensate from air conditioning installations.

Air conditioning units use a heat-exchanger to chill air passing through the unit, producing condensation as it does so. In many cases, the condensation is produced remote from any convenient drain. Accordingly, a condensate removal pump is provided to convey the water through tubing or other pipework to a suitable drainage point. Condensate removal pumps are typically comparatively small reciprocating piston pumps and are conveniently hidden from view within ducting, trunking or conduit along with their associated hoses.

The movement of the piston reciprocating at the frequency of the electricity supply (typically 50-60 Hz) induces a pulse in the water flow at the same frequency. This pulse is, in turn, transferred to the tubing connected to the outlet of the pump. This can lead to vibrations within the trunking and thus an irritating noise, in extreme cases, from the trunking itself. The present invention seeks to overcome this problem.

BRIEF SUMMARY OF THE INVENTION

In its broadest sense, the present invention provides a liquid pulse damping device comprising a body having an inlet and an outlet in fluid communication. Intermediate the inlet and outlet is at least one liquid flow direction changing element.

Preferably, the at least one flow direction changing element is in the form of an elongate element having a closed end and aside wall, suitably a cylindrical side wall, having at least one bore formed therethrough.

More preferably, a plurality of bores are formed through the side wall. More preferably, the bore or plurality of bores have a combined area greater than an area of the inlet.

In preferred embodiments, the device comprises a plurality of flow-direction changing elements. Most preferably, the device comprises two flow-direction changing elements. Preferably, the two elements are arranged such that the closed ends of the two elements are in an opposed configuration.

BRIEF DESCRIPTION OF THE SEVERAL VIEWS OF THE DRAWING

The above and other aspects of the invention will now be described in further detail with reference, by way of example only, to the accompanying drawings, in which:

FIG. 3 is an exploded cross-sectional view of the embodiment of FIG. 2; and

DETAILED DESCRIPTION OF THE INVENTION

Figure 1:
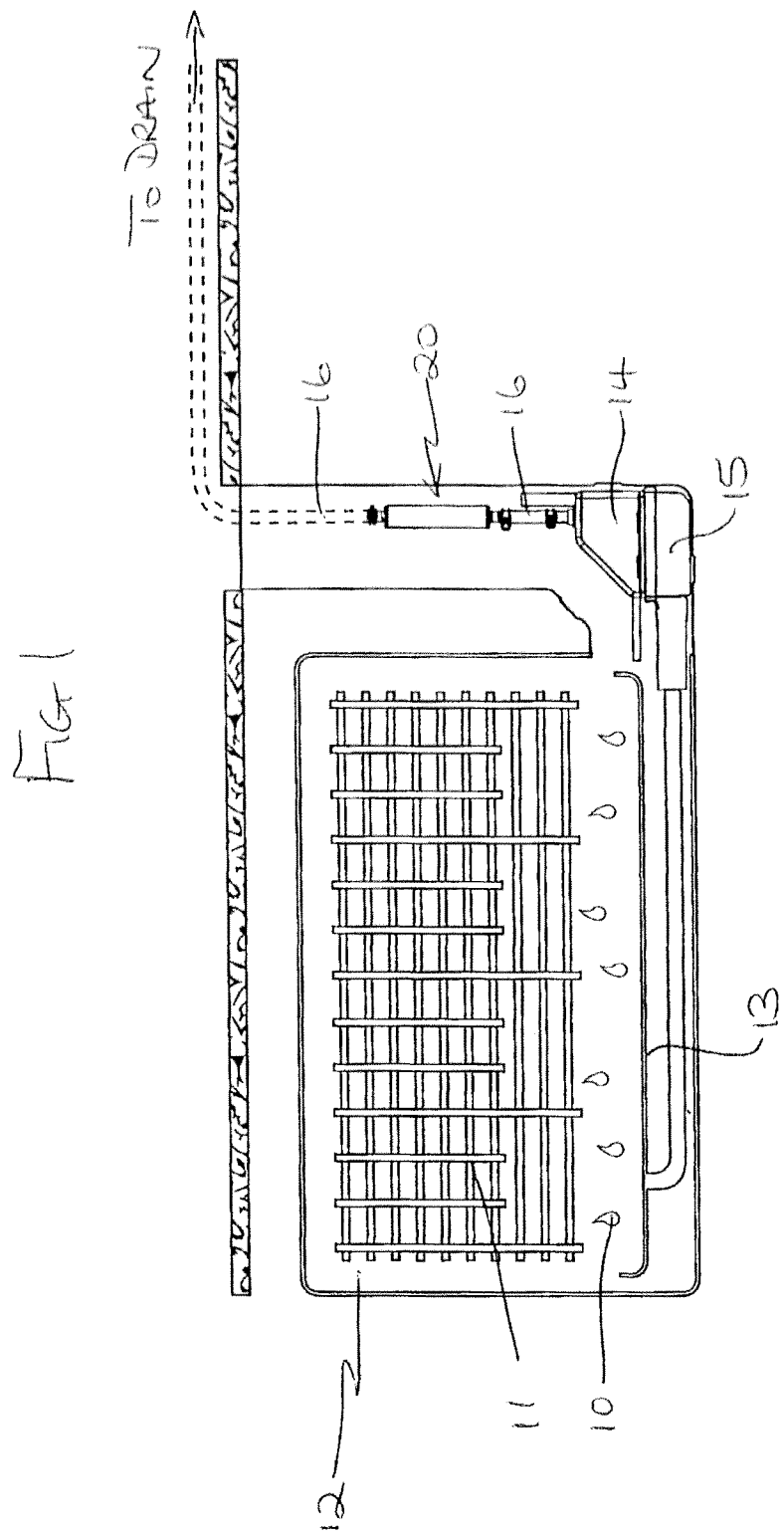
FIG. 1 is a cross-sectional view of a representative air conditioning heat exchange installation showing an embodiment of a pulse damping device in accordance with the present invention.

FIG. 1 shows, schematically, part of a typical air conditioning installation in which condensate 10 drips off cooling fins 11 of an evaporator 12 and is collected in a tray 13. The condensate is expelled to a convenient drain by means of a pump 14. As shown, pump 14 is of the type with an integral reservoir 15. Reservoir 15 includes a float switch (not shown) activation of which in response to the presence of condensate in the reservoir causes operation of the pump and thus expulsion of condensate along a hose 16 to the drain. The pump 14 is typically of the reciprocating piston type in such installations.

Figure 2:
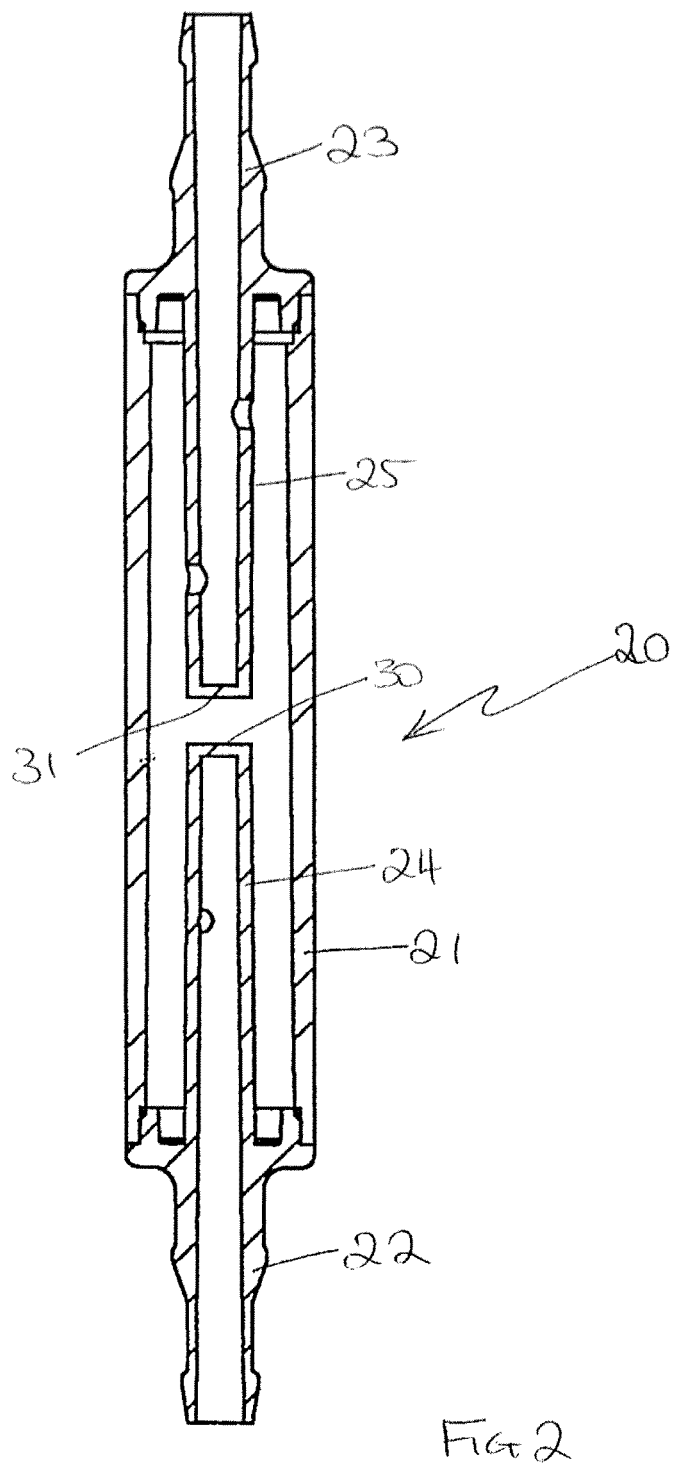
FIG. 2 is a cross-sectional view of an embodiment of the device of the present invention.
Figure 4:
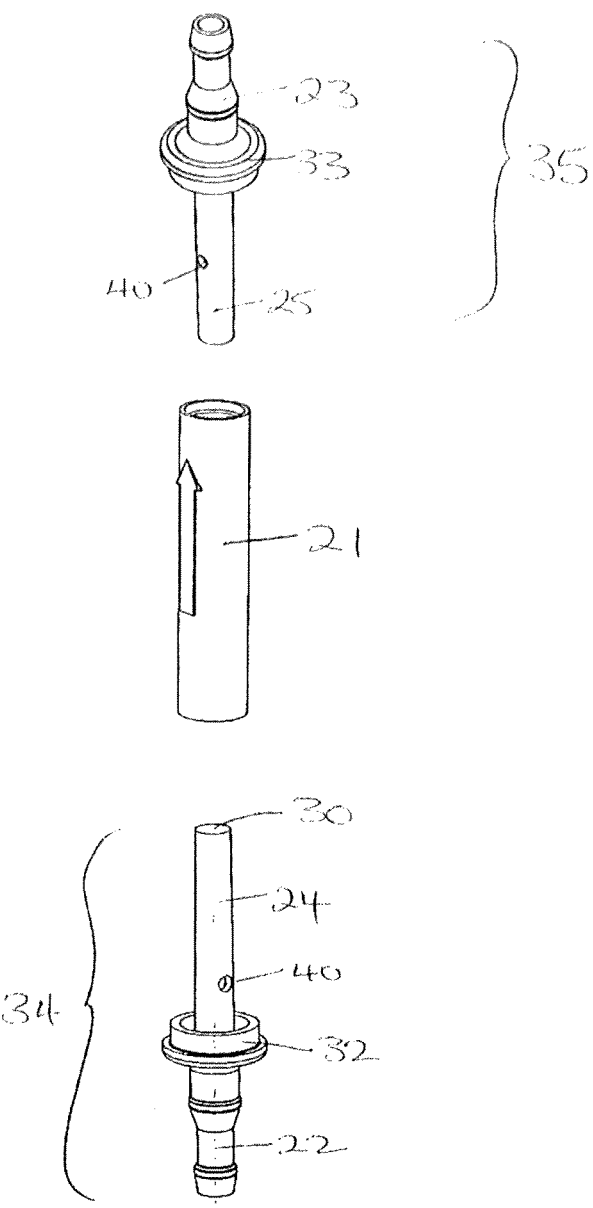
FIG. 4 is an exploded perspective view of the embodiment of FIG. 2.

The damping device 20 is shown in greater clarity in FIGS. 2 to 4. The device 20 comprises a generally cylindrical sleeve 21 having an inlet 22 and outlet 23. Sleeve 21 acts as an accumulator to provide a substantially constant volume of water entering and leaving the device. Accumulators are known per se for providing a degree of pulse smoothing. The damping device includes fingers or projections 24 and 25 respectively associated with the inlet 22 and outlet 23, each defining a liquid flow direction changing element. Projections 24,25 are elongate elements and are closed at an end remote the inlet or outlet as shown at 30 and 31 respectively. As shown, elongate projections 24,25 are suitably formed with a generally cylindrical wall.

Preferred embodiments include two flow direction changing elements 24, 25 as shown, but reduction of pulsing is achievable with a single flow direction changing element.

Elongate projections 24,25 are aligned, in the embodiment shown, along a common axis with closed ends 30,31 in an opposed, but spaced relationship. In alternative embodiments (not shown), projections 24,25 are formed as a unitary component and may be secured into sleeve 21 by means, for example, of a compression-type arrangement. In the embodiment shown, however, each projection 24,25 is individually mountable to sleeve 21 being formed with its respective inlet or outlet and a cap 32,33 as an inlet projection assembly 34 and outlet projection assembly 35. Suitably, caps 32,33 and held in place by an adhesive or sonic welding. Alternatively, the caps may be secured by a compression fitting.

Each projection is provided with one or more bores 40 in the walls thereof. By this means, water entering the inlet 22 must pass to the outlet 23 by a circuitous route including many directional changes. Pooling of water and reflection of water waves around the projections also occurs which, with the directional changes, causes the pump-generated pulses in the water to be absorbed by interference of the water flow waves.

The combined area of bores 40 in each projection 24,25 is selected to be slightly greater than the area of the inlet and outlet, which will both normally be of the same diameter, in order to have a minimal impact on flow rate through the device.

In the preferred embodiment shown, the bores 40 of the outlet projection assembly 35 are fewer in number but larger in diameter than those of the inlet projection assembly 34. This provides further attenuation of pulsing, but is not essential for achieving advantageous results. Indeed, pulse reduction is achieved regardless of the direction of flow through device.

Furthermore, in non-preferred embodiments (not shown) the device has a single projection assembly and the second assembly is replaced with a simple cap construction. This allows the cap, for example, an outlet cap, to be moulded as a unitary component with sleeve 21, thereby simplifying manufacturing. The pulse-reducing effect is reduced compared with the illustrated embodiment, but a substantial improvement is nevertheless obtained.

It will be appreciated that an accumulative effect can be obtained by providing a plurality of devices of the present invention in series in the outlet tubing from the pump 14.

The invention claimed is:

1. A liquid pulse damping device comprising a body having an inlet and an outlet in fluid communication and comprising, intermediate the inlet and outlet, an inlet liquid flow direction changing element and an outlet liquid flow direction changing element, wherein each flow direction changing element is in the form of an elongate element having a closed end and a side wall having a plurality of bores formed therethrough, and wherein the plurality of bores of each flow direction changing element have a combined area greater than an area of the inlet and wherein the bores of the outlet flow direction changing element are fewer in number but larger in diameter than the bores of the inlet flow direction changing element.

2. A device as claimed in claim 1 wherein the side wall is a cylindrical side wall.

3. A device as claimed in claim 1 wherein the closed ends of the two elements are in an opposed configuration.

* * * * *